United States Patent [19]
Kleiss

[11] 3,830,698
[45] Aug. 20, 1974

[54] METHOD AND APPARATUS FOR CONTROLLING THE TEMPERATURE IN A FRACTIONATION COLUMN
[75] Inventor: Louis D. Kleiss, Borger, Tex.
[73] Assignee: Phillips Petroleum Company, Bartlesville, Okla.
[22] Filed: Dec. 30, 1971
[21] Appl. No.: 214,482

Related U.S. Application Data
[63] Continuation of Ser. No. 869,794, Oct. 27, 1969, abandoned.

[52] U.S. Cl. .................. 203/2, 202/160, 202/206, 203/DIG. 18, 235/151.12
[51] Int. Cl. ............................................. B01d 3/42
[58] Field of Search ......... 203/2, DIG. 18; 202/206, 202/160; 196/132; 235/151.12

[56] References Cited
UNITED STATES PATENTS

| | | | |
|---|---|---|---|
| 2,580,651 | 1/1952 | Boyd | 203/2 |
| 2,684,326 | 7/1954 | Boyd | 203/2 |
| 3,464,895 | 9/1969 | Boyd | 203/2 |
| 3,506,715 | 4/1970 | Clark | 203/2 |

Primary Examiner—Wilbur L. Bascomb, Jr.

[57] ABSTRACT

A plurality of temperature sensing probes are positioned within a separating column at specific spaced-apart locations throughout the column for obtaining a temperature measurement related to the column's compositional behavior and automatically controlling the operation of the column in response to computation of the plural temperature measurement.

6 Claims, 1 Drawing Figure

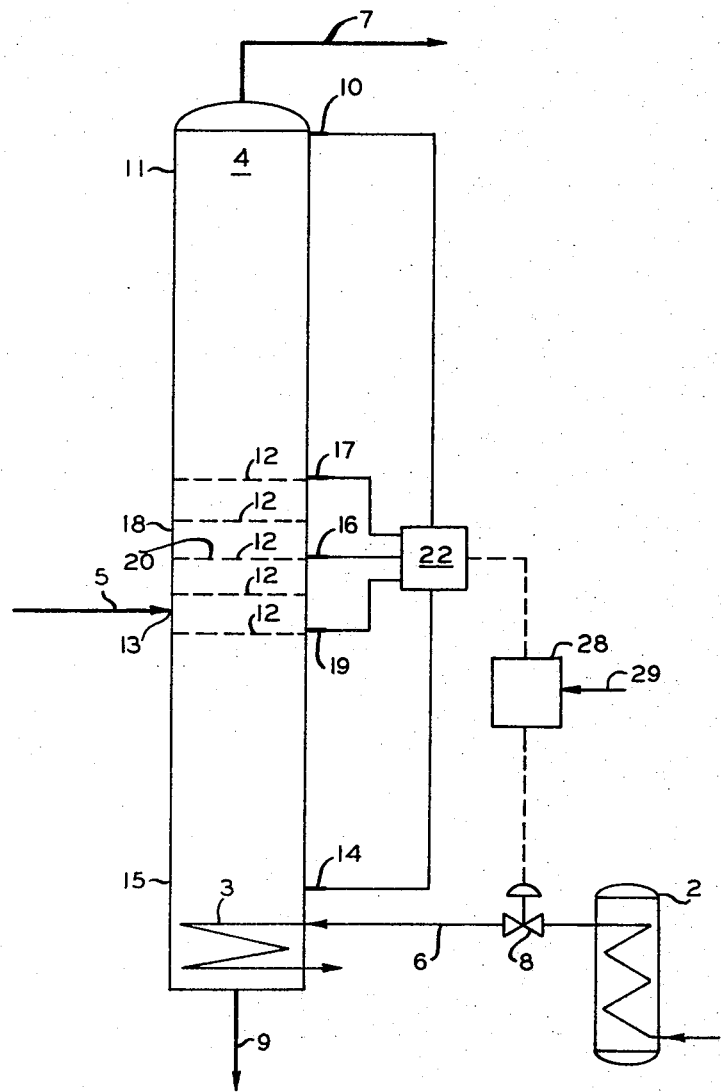

METHOD AND APPARATUS FOR CONTROLLING THE TEMPERATURE IN A FRACTIONATION COLUMN

This is a continuation of application serial No. 869,794 now abandoned.

This invention relates to controlling the operation of a separating column. In another aspect, this invention relates to a method and apparatus for maintaining a constant composition at a specific controlling location in a separating column.

In a usual separating operation, such as fractionation, a mixed or multicomponent fluid stream is charged to approximately the midpoint of the column, which is a vertically disposed chamber having a plurality of spaced trays or decks which affect a desirable contacting of the countercurrently flowing liquid and vapor streams within the column. Heat is normally supplied to the column by means of a reboiler or a heating coil connected into the lower portion of the column, while reflux is normally returned to the top of the column in a regulated quantity suitable for rectification within the upper portion of the column. Also, in present types of continuously operating fractionating columns and control systems, a temperature or composition indicating and controlling means is connected to the interior of the column at either the stripping section or the rectification section, and the heat input or removal is regulated by this temperature controller through varying the heat input by the reboiler, or changing the quantity of reflux returned to the top of the column. Alternatively, a material balance control system is sometimes utilized which provides a flow controller on the bottoms product which varies with changes in the flow rate of the feed stream to the column. Still another control method is the use of a reference material at a selected control point in the column whereby the differential between the vapor pressure in the column and that of the reference fluid controls the heat supplied to the fractionating column.

Each of these methods has merit in particular applications. Temperature measurement at some intermediate point in the column and control therefrom is a relatively inexpensive and dependable method of controlling product composition and can be used in columns where other types of measurement are difficult or impossible. It is particularly useful in separating components which have widely differing boiling points. However, there are two problems associated with column temperature control. First, the temperature measurement reflects the boiling point of a liquid, and is sensitive to pressure fluctuations within the column. Second, it is usually desirable to measure and control temperature at the most sensitive point, i.e., where the temperature gradient is greatest between trays. Frequently, the temperature response to a change in column operation is nonlinear and erratic at this otherwise desirable control location.

This erratic temperature response is most pronounced when the separating column is used to separate components having widely differing boiling points. In this case there exists within the column a zone of abrupt composition change from one tray to the next. Above and below this zone of abrupt composition change exist zones of relatively gradual concentration change. Application of heat or reflux to the column drives these zones up or down in the column. It is an objective of column control to hold these zones at some specific location within the column. The composition at any tray is indicated by a temperature sensor, since composition is related to boiling point.

An incremental change in column heat or reflux rate may drive these zones up or down the column by a matter of only a few trays, for example. If a single temperature sensor is located in the zone of abrupt concentration gradient, its response to this increment is relatively large. If the column is now upset so that the zone of abrupt concentration change is driven up or down in the column relative to the location of the sensor, the sensor will then be located in a zone of gradual concentration change. The response of the sensor to the same increment of heat or reflux is now relatively small. The signal produced by the lone sensor is thus nonlinear with respect to the amount of heat or reflux applied. A nonlinear measurement signal is not desirable in a feedback control system. If the control loop is tuned for best control while the sensor is in the abrupt gradient zone, control will be sluggish and unresponsive when the zones shift and the sensor is exposed to a gradual gradient zone. Alternatively, if the control loop is tuned for good response when the sensor is exposed to a gradual gradient zone, control will be over responsive and oscillatory when the sensor is in the abrupt gradient zone.

It is therefore an object of this invention to provide an improved apparatus and method for controlling the operation of a separating column. Another object of the invention is to provide a composition measurement signal which is relatively linear with respect to changes in heat or reflux rates. A further object of the invention of the above-described type is to provide a control apparatus and method that regulates the temperature of the column in response to a composite temperature computation from temperatures of a plurality of sensing locations in the column. Other aspects, objects and advantages of the present invention will become apparent from a study of the disclosure, the appended claims, and the drawing.

The drawing comprises a single diagrammatic FIGURE in partial section showing a separating column and reboiler with the controlling apparatus of this invention.

In the drawing, a heating coil 2 is located within a vertical separating column 4. A control valve 8 is positioned, for example, within the pathway of a heating fluid stream that generates reboiling vapor for the column 4 flowing through line 6 for controlling the flow rate of heating fluid into coil 3. A feed stream is supplied to column 4 by line 5 and overhead vapor and bottoms liquid streams are removed by lines 7 and 9, respectively. A portion of the overhead vapor is condensed and returned to the top of column 4 as reflux.

At least one upper-zone temperature-sensing probe 10 is positioned within an upper portion 11 of the column 4 for sensing the temperature of the fluid at the top of the column and delivering a signal representative of that temperature. The upper-zone sensing probe is preferably positioned at a higher elevation than an uppermost tray of a plurality of vertically spacedapart trays 12 positioned within a column 4. At least one lower-zone temperature-sensing probe 14 is positioned within a lower portion 15 of the column 4 for sensing the temperature within the column and delivering a signal representative of that temperature. The lower-zone sensing probe 14 is preferably positioned at a lower elevation than a lowermost tray of a plurality of vertically spaced-apart trays 12 positioned within the column 4. A controlling-point temperature-sensing probe 16 is positioned at a controlling location 20 within a middle zone portion 18 that is a zone of maximum temperature gradient of the vertical column 4 for sensing the temperature of that fluid within the column and delivering a signal representative of that temperature. The position of the controlling location 20 is preselected at a location within the column at which it is desired to maintain a certain specific temperature. That location is associated with a relative to the general construction of the column 4, the feed and reflux flow rates into the column, and the composition of the fluids within the column 4. It is preferred that the controlling location 20 be selected as the approximate midpoint of the middle-zone portion 18 of the column 4, more preferably near an inlet 13 for fluid feed stream 5 in order that a more widespread temperature sampling can be achieved adjacent the location within column 4 at which abrupt temperature variations occur. The location of this zone of maximum temperature gradient may be calculated from anticipated feed, overhead, and bottoms product compositions, plus information about column trays and efficiency. Alternatively, the location of this zone 18 may be determined by direct measurements on an operating column at steady state conditions. I have discovered that certain mathematical combinations of these temperatures are linear with respect to the rate of heat input to the column. As this zone of maximum temperature gradient 18 shifts up or down, the temperature above zone 18 shows a nonlinear response in one direction while the temperature below zone 18 shows a nonlinear response in the other direction. These nonlinearities cancel when summed.

At least two middle-zone temperature-sensing probes 17 and 19 are positioned within the middle-zone portion 18 of the column 4 adjacent the controlling-point temperature-sensing probe 16 with probes 17 and 19 being positioned vertically opposed to and substantially equally spaced from the controlling-point probe 16 for sensing the temperatures within the column 4 at these points and delivering signals representative of these temperatures.

The middle-zone temperature-sensing probes 17 and 19 may be considered as a probe pair, one probe of the pair being located in the upper portion of the zone of maximum temperature gradient 18, and the remaining probe of the pair being located in the lower portion of zone 18. If desired, a plurality of probe pairs can be employed wherein each probe of each probe pair is positioned at vertically opposed positions relative to the controlling-point temperature-sensing probe 16 and with each probe being substantially equally, vertically spaced from an adjacent probe. By so positioning each middle-zone probe pair associated with the controlling-point probe 16, the function of the computer 22 (to be later described) is simplified and operational control of the column therefrom is more precise. In order to further simplify construction of the computer 22, yet position a plurality of probes in the middle-zone portion 18 of the column 4 as described above, it is preferred that each additional probe of each additional probe pair associated with the middle-zone portion 18 of the column 4 be positioned immediately adjacent a separate, consecutively positioned tray 12 of the column 4 and that each temperature probe comprises a thermocouple positioned within the column 4.

A computer 22 is operatively connected to each temperature sensing probe 10, 14, 16, 17 and 19. The computer 22 is constructed to receive the signals delivered by each sensing probe, compute a first sum consisting of the signals received from the upper and lower zone probes 10 and 14, compute a second sum consisting of the signals received from the middle-zone probes 16, 17 and 19, subtract the first sum from the second sum, and divide that resultant difference by any difference greater than one (resulting from use of additional middle-zone probes) between the number of probes located in the middle-zone portion of the column and the number of probes located in the upper and lower portions of the column, and finally to deliver a signal, preferably an electrical signal, for simplicity of the apparatus, representative of these computations.

The computer 22 utilized in this invention can be an analog computer, a digital computer or an assemblage of thermocouples connected relative to one another so as to perform the desired additions and subtractions.

The computer output is a measurement signal related to the operation of column 4 and is applied to controller 28. Controller 28 compares this signal with a set point signal 29 that is calculated and representative of the desired value of the computed temperature, produces an output signal to position control valve 8, and thus, for example, regulates the heat input to column 4 by throttling the flow of heating fluid to the reboiler so that the magnitude of the output signal from computer 22 will coincide with that of set point 29 to controller 28. If the measurement from computer 22 is lower than set point 29, control valve 8 is positioned toward a more open position and vice versa. The control valve can also be located in the pathway of any fluid associated with the operation of the column 4 such as, for example, a reflux stream, heating fluid stream and the like, the other column streams being controlled compatibly with this primary regulating system.

The controlling apparatus of this invention can also be constructed with a plurality of vertically spaced-apart upper and lower zone temperature-sensing probes so long as the number of temperature-sensing probes positioned within the middle portion of the column is greater than the sum of the temperature sensing probes located in the upper and lower portions of the column. By having a plurality of temperature sensing probes in the upper and lower portions of the column, column pressure changes which produce temperature changes are sensed, temperature fluctuations and gradients in the upper and lower portions of the column are incorporated in the computation made by the computer, and a more precise and meaningful measurement of column operating conditions is utilized for controlling the separation performed by the column.

In the operation of the apparatus of this invention, a fluid feed stream comprising differing components enters the separating column 4. The temperature of the fluid within the upper, lower, and middle portions of the column 4 is measured by an upper-zone temperature-sensing probe 10, a lower-zone temperature-sensing probe 14, a controlling-point temperature-sensing probe 16 and a plurality of middle-portion temperature-sensing probes. By obtaining temperature measurements at separated locations throughout the column, signals representative of a temperature gradient of the column are reported to the computer. The plurality of sensing probes positioned on opposed sides of the controlling-point temperature-sensing probe 16 located at the controlling location dampen the effects of sudden temperature fluctuations occurring in the area of the controllng location and enable the control equipment to maintain a more uniform flow of heating fluid into the column 4.

Separate signals representative of each temperature measured at the separate locations are delivered to the computer 22. The computer 22 separately adds the signals received from the middle portion of the column and the upper and lower portions of the column, subtracts the composite signal of the upper and lower zone probes from the composite signal of the middle portion probes, divides that resultant difference by any difference greater than one between the number of probes located in the middle portion of the column less than the number of probes located in the upper and lower portions of the column, and delivers a signal to controller 28 which in turn delivers a signal to the control valve 8 for controlling, for example, the volume of heating fluid passing through the control valve and into the column 4.

An example of the operation of the apparatus of this invention is as follows:

Feed stream into column:

|  |  | Moles |
|---|---|---|
| Hydrocarbons |  | 4.2 |
| Water |  | 9.6 |
| Oils |  | 11.5 |
| Furfural |  | 74.7 |
|  | Total: | 100.0 |

Overhead stream discharging from column:

| Hydrocarbons |  | 4.2 |
|---|---|---|
| Water |  | 0.2 |
| Oils |  | trace |
| Furfural |  | trace |
|  | Total: | 4.4 |

Kettle product discharging from column:

| Hydrocarbons |  | trace |
|---|---|---|
| Water |  | 9.4 |
| Oils |  | 11.5 |
| Furfural |  | 74.7 |
|  | Total: | 95.6 |

The pressure of the column was 77 psig and the temperature of the feed stream was 265°F.

There was one sensing probe in the upper portion of the column measuring 128°F, three sensing probes in the middle portion of the column measuring, consecutively downwardly, 130°F, 200°F, and 265°F, and one sensing probe in the lower portion of the column measuring 312°F.

The computer added the middle temperature measurements and added the upper and lower measurements and thereafter subtracted the summation of the upper and lower measurements from the middle measurements for a calculation of a 155°F value. A measurement signal representative of 155 was then delivered to the controller. The set point of the controller was 155. The received signal was compared to the value of the set point and since there was no difference, no change was made in the signal delivered to the control valve 8.

Other modifications and alterations of this invention will be apparent to those skilled in the art from the foregoing discussion and accompanying drawing, and it should be understood that this invention is not to be unduly limited thereto.

What is claimed is:

1. Apparatus adapted to separate a fluid mixture comprising: a fractionation column having upper, middle and lower portions; means to supply heat to said column;

a first temperature sensing element positioned within the upper portion of the column to sense the temperature of the fluid within the column and establish a first signal representative thereof;

a second temperature sensing element positioned within the lower portion of the column to sense the temperature of the fluid within the column and establish a second signal representative thereof;

a third temperature sensing element positioned within the middle portion of the column to sense the temperature within the column and deliver a third signal representative thereof;

a pair of fourth temperature sensing elements positioned within the middle portion of the column in spaced relationship with one another so that the third element is between and substantially equally spaced from the individual elements of the pair, said pair of fourth elements sensing the temperatures of the fluid within the column and establishing respective fourth and fifth signals representative thereof;

first means responsive to said first, second, third, and fourth and fifth signals to establish a sixth signal which is representative of the difference between the sum of said third, fourth and fifth signals and the sum of said first and second signals; and second means responsive to said sixth signal to control said means to supply heat to said column.

2. An apparatus, as set forth in claim 1, wherein the column contains a plurality of trays vertically spaced from one another and wherein the first temperature-sensing element is at a higher elevation than the uppermost tray of the column and the second temperature-sensing element is at a lower elevation than the lowermost tray of the column.

3. An apparatus, as set forth in claim 1, wherein each temperature-sensing element comprises a thermocouple positioned within the column.

4. An apparatus, as set forth in claim 1, wherein the second means comprises a controller having a set point representative of the temperature desired to be maintained at the controlling location and causes the means to supply heat to be urged toward a position of delivering more heat in response to computing a signal lower than the set point and toward a position for delivering less heat in response to computing a signal higher than the set point.

5. The method of controlling the operation of a fractionation column, comprising:

measuring the temperature within the upper portion of the column and establishing a first signal representative thereof;

measuring the temperature within the lower portion of the column and establishing a second signal representative thereof;

measuring the temperatures at three locations in the middle portion of the column and establishing a third, fourth and fifth signals, respectively, representative thereof, the locations being equally spaced from one another vertically;

adding the first and second signals and establishing a sixth signal representative of the sum;

adding the third, fourth and fifth signals and establishing a seventh signal representative of the sum;

subtracting the sixth signal from the seventh signal and establishing an eighth signal representative of the difference;

supplying heat to the lower portion of the column; and controlling the rate at which the heat is supplied to the column in response to the eighth signal.

6. A method, as set forth in claim 5, wherein the column contains a plurality of trays vertically spaced from one another, and wherein the measurement which establishes the first signal is made at a location above the uppermost tray in the column and the measurement which establishes the second signal is made at a location below the lowermost tray in the column.

* * * * *